H. LAWRENCE.
SAWING STONE, &c.
No. 15,242. Patented July 1, 1856.
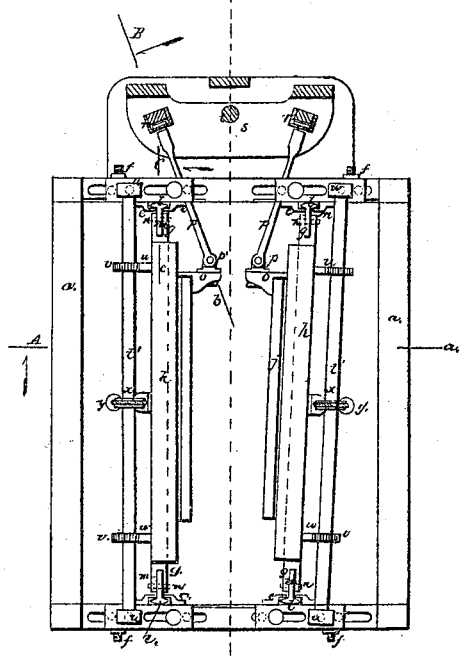
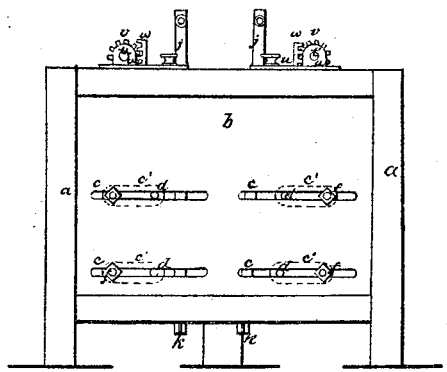
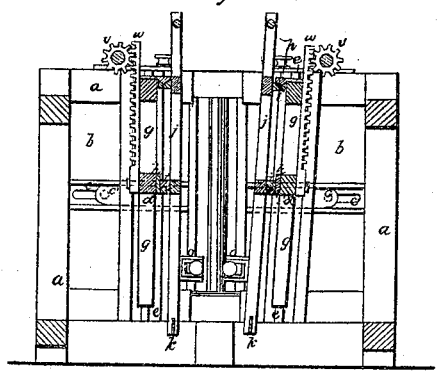
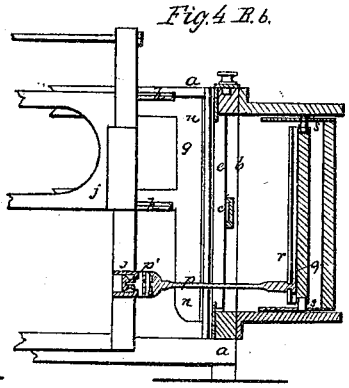
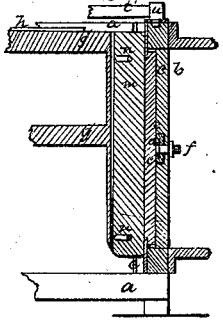
Witnesses
Inventor:
Henry Lawrence

UNITED STATES PATENT OFFICE.

HENRY LAWRENCE, OF NEW YORK, N. Y.

MARBLE-SAWING MACHINE.

Specification of Letters Patent No. 15,242, dated July 1, 1856.

*To all whom it may concern:*

Be it known that I, HENRY LAWRENCE, of the city, county, and State of New York, have invented certain new and useful Improvements in Machinery for Sawing Blocks of Stone, Marble, Wood, or other Substance, of which the following is a full, clear, and exact description, reference being had to the accompanying drawings, making part of this specification, in which—

Figure 1 is a plan of the machine with the rocking frame for operating the saw gates, in section; Fig. 2 an end elevation; Fig. 3 a cross vertical section taken at the line A, $a$ of Fig. 1; Fig. 4 a vertical section taken at the line B, $b$ of Fig. 1; Fig. 5, a separate section at the line C, $c$ of Fig. 1.

The same letters indicate like parts in all the figures.

By the improvement which I have invented the same machine can be set to make two cuts simultaneous either in planes parallel with each, longitudinally and transversely or at any angle with each other. And to effect this my invention consists in mounting the gates which carry the saws or blades each in suitable longitudinal ways in a frame, the ends of which are fitted to slide up and down in ways each of which is separately connected with the main frame by a journal or stem fitted to a horizontal slot or mortise in the main frame so that the said ways may be turned on the said journal to any inclination desired from the vertical and there secured that the frame which carries the ways in which the saw gates slide longitudinally may move up and down to make the plane of the feeding motion of each at any inclination desired relatively to the other. Or by shifting the journals or stems of the said ways in the slots or mortises and there securing them the ways on which the saw gates slide can be adjusted, so that the plane of the cutting motion of each may be at any desired angle relatively to the other. In this way by simply turning the ways on their journals the plane of motion of the two saws can be set parallel with each other or at any desired angle from a vertical plane, and by simply sliding the said journals in the slots and securing them the line of motion of the two saws can be set parallel with each other or at any desired angle. And my said invention also consists in combining with the above method of mounting the saw frames the connecting of the pitman or connecting rods with each saw frame with a hinge which will allow a lateral play, and connecting the opposite end of the said pitman or connecting rod by a universal and sliding joint with a rocker that rocks on a vertical axis, by means of which the two saws are moved simultaneously in opposite directions, and the same range of motion imparted during the entire cut, and the cutting motion imparted to the saws at whatever angle they may be set to cut.

In the accompanying drawings $a$ represents the main frame made of sufficient length to admit of the required play of the saw or blade gates and with the ends $b$, $b$ provided with horizontal slots or mortises $c$, $c$, $c$, $c$, to receive slides $c'$, $c'$ in which journals or stems $d$, $d$, $d$, $d$ of four ways $e$, $e$, $e$, $e$ are fitted, two such slots at one end and four at the other. The slides $c'$ are secured in the slots by screw nuts, and by shifting and adjusting these the ways can be shifted to any position desired from a vertical line in either direction or to any distance apart desired within the capacity of the frame and length of the slots, and as these slides are provided with suitable washers and nuts $f$ when set to the required position they can be firmly held in place. These four ways are arranged in pairs two on each side of the central longitudinal vertical plane of the machine represented by the line $x$, $x$, Fig. 1. To each pair of ways $e$, $e$ is fitted a frame $g$ the ends of which are fitted to slide therein freely but accurately, and these two frames $g$, $g$ are each provided with longitudinal ways $h$, $h$ to which are fitted the slides $i$, $i$, of the gates $j$, $j$, which carry the saws or blades $k$, $k$, the saws or blades being placed at the lower part of the gates and as far below the lowest slide $i$, as the thickest block to be sawed.

From the above it will be seen that each gate $j$ can slide independently of the other gate on its horizontal ways $h$, $h$, of its frame $g$ to give the cutting action to the saw or blade, while the frame $g$ which carries the ways $h$, $h$ can be moved up and down at pleasure to give the feeding motion as the saw or blade cuts through the block. And as the ways $e$, $e$ in which the frame $g$ moves up and down can be shifted and set and held at any inclination and distance from the longitudinal vertical plane $x$ $x$, the saw or blade can make its longitudinal cut at any angle with the said longitudinal plane and have its feed motion as it cuts through the block at any angle to the said vertical plane, in this way the two cuts can be made simultaneously in planes either parallel with the longitudinal line of the said plane $x, x$ or at any desired angle to the vertical line of the said plane $x, x$, and the plane of the cut made by one saw or blade may be at angles from the said plane entirely different from the angles of the plane cut by the other saw or blade.

The ends of the frames $g$, which fit the ways $e, e$ are curved as at $l$ so as to be capable of turning in the said ways when the frames $g$ are inclined to the longitudinal line of the plane $x, x$, and as the distance between the ways $e, e$, at opposite ends of the main frame, varies as the frames $g, g$ are variously inclined and the ways $e, e$ are secured against the inner face of the ends of the main frame, provision is made to meet this contingency by making the parts $l$, which are fitted to the work in the ways $e, e$ separate from the frames $g, g$ and with a projecting fillet $m$ fitted each to slide in a recess in the ends of the said frame and connected by screw bolts $n, n$ passing through longitudinal slots in the fillets to admit of the required end play.

One end of each gate is provided with a wing $o$ projecting inward to which is hinged one end of a pitman or connecting rod $p$, so that the said pitman or connecting rod can vibrate on the axis of this hinge which is to be vertical however the ways $e, e$ may be inclined. As the ways are capable of being placed at any desired inclination from a vertical line, and the axis of the hinge must always be in a vertical line for the proper working of the pitman, one wing $p'$ of the hinge is connected with the wing $o$ by a round wrist and securing nut, so that by loosening the said nut the ways can be placed at any desired inclination with the axis of the hinge. And the other end of the said connecting rod is square and has a button $q$, so that it can slide in and be embraced by suitable ways in a vertical rocker $r$, hung in a vibrating or rocking frame $s$ at one end of the main frame, which vibrates on a vertical axis $t$. Two such rockers $r$, are mounted in the said rocking frame $s$ on opposite sides of, and at equal distance from the axis of vibration of the said rocking frame $s$ which is to receive motion from any suitable motor. As the outer end of each pitman with its button $q$ can slide up and down in its appropriate rocker $r$, and the inner end is hinged to the saw gate and can vibrate thereon in a horizontal plane, and the hinge can turn on the ways $e, e$, it will be seen that the rocking motion of the rocking frame $s$ will impart the cutting motion to the gates and their saws or blades at whatever angle the plane of the cuts may be set to the longitudinal vertical plane $x, x$, while at the same time the saw gates can be moved up and down without changing the length of the stroke of the saw or blade.

Two shafts $t', t'$, one on each side are mounted in boxes $u, u$, which can be shifted and adjusted on the main frame at pleasure. Each shaft carries two pinions $v, v$, the cogs of which engage the cogs of racks $w, w$, on the corresponding sliding frame $g$, so that by the turning of the shaft the frame with the saw gate will be elevated or depressed at pleasure. Each shaft is provided with a grooved pulley $x$ with a cord and counter weight $y$ which will nearly balance the frame $g$ and saw gate mounted therein. Any other mode of sustaining the weight of the frame and saw gate may be substituted. And although the principal object of my said invention is for sawing marble and stone, it will be obvious that by the application of a suitable saw, blocks of wood can be sawed.

I am aware that to avoid varying the length of the stroke of the saw gate as it is moved up and down the pitman has been rigidly attached to the end of the saw gate, and the other end adapted to slide up and down on a rod attached to a reciprocating frame that slides on horizontal ways, and therefore I do not wish to be understood as making claim to such mode of connection; but it will be seen that such mode of connection could not be applied to operate two saws simultaneously in opposite directions that one may make its cut while the other returns, and that it could not be applied to a blade or saw gate whose plane of motion requires to be shifted. And I am also aware that saw gates have been variously mounted so that they could be set to cut at various angles, and therefore I wish it to be understood that I do not claim broadly the mounting of saw frames or gates so that they can be set to cut in planes at various angles.

What I claim as my invention and desire to secure by Letters Patent is—

1. Mounting the two saw frames each in ways on the side of a frame, substantially as described, in combination with, and when such frame is provided at its ends with slides fitted to slide up and down in separate ways connected with the main frame by journals or stems adapted to turn and slide in suitable slots and there held and secured, substantially as described whereby the said saws can be set each independently of the other to have its cutting and feeding motions at any desired angle by simply turning or shifting the journals of the said ways.

2. And I also claim in combination with the before described manner of mounting the two saw frames in adjustible sliding frames adapted to shifting and turning ways, substantially as described, the mode of imparting motion to the said saw gates by means of pitman or connecting rods hinged at one end to the saw gate and at the other fitted to slide and turn in rockers mounted in and free to turn in a rocking frame which receives motion from some suitable motor, substantially as and for the purpose described.

HENRY LAWRENCE.

Witnesses:
WM. H. BISHOP,
CHAS. A. WILSON.